(12) United States Patent
Adamczewski et al.

(10) Patent No.: US 7,802,708 B2
(45) Date of Patent: Sep. 28, 2010

(54) CLAMP-ON MATERIAL CARRIER FOR A PANEL TRUCK

(76) Inventors: Zbigniew Jozef Adamczewski, 1115 Saint Louis Ave. #1, Long Beach, CA (US) 90804; Ruth Esther Gosey, 1115 Saint Louis Ave. #1, Long Beach, CA (US) 90804

( * ) Notice: Subject to any disclaimer, the term of this patent is extended or adjusted under 35 U.S.C. 154(b) by 1015 days.

(21) Appl. No.: 11/583,408

(22) Filed: Oct. 18, 2006

(65) Prior Publication Data

US 2008/0110949 A1    May 15, 2008

(51) Int. Cl.
    B60R 9/00    (2006.01)
(52) U.S. Cl. .................. 224/543; 224/42.33; 224/405
(58) Field of Classification Search ............... 224/543, 224/42.33, 402, 405, 281, 510, 495, 497, 224/498, 554, 570, 552, 523, 525, 526, 530, 224/531, 536; 211/41.15; 296/3
    See application file for complete search history.

(56) References Cited

U.S. PATENT DOCUMENTS

| | | |
|---|---|---|
| 1,991,900 A | 2/1935 | Larsen |
| 2,080,527 A | 5/1937 | Bixel |
| 2,980,379 A | 4/1961 | Goldfus |
| 3,443,730 A | 5/1969 | Meusel |
| 4,278,175 A | 7/1981 | Jackson |
| 4,817,834 A | 4/1989 | Weiler |
| 4,927,032 A | 5/1990 | Mercure |
| 4,944,434 A | 7/1990 | Hamilton |
| 4,989,768 A | 2/1991 | McNulty |
| 5,255,951 A | 10/1993 | Moore, III |
| 5,450,956 A | 9/1995 | Peckenpaugh, Sr. et al. |
| 5,456,564 A | 10/1995 | Bianchini |
| 5,713,620 A | 2/1998 | Port |
| 6,032,842 A | 3/2000 | Brickner |
| 6,126,053 A | 10/2000 | Shaver |
| 6,193,123 B1 | 2/2001 | Adamczewski et al. |
| 6,450,379 B1 | 9/2002 | Cook |
| 6,511,275 B2 * | 1/2003 | Ray .......................... 414/11 |
| 6,845,894 B1 | 1/2005 | Vyvoda |
| 7,090,105 B2 | 8/2006 | Adamczewski et al. |

* cited by examiner

Primary Examiner—Nathan J Newhouse
Assistant Examiner—Corey N Skurdal
(74) Attorney, Agent, or Firm—Gene Scott; Patent Law & Venture Group

(57) ABSTRACT

A panel truck provides a material carrier made up of a fixed frame clamped the a rain gutter of the truck and a movable frame that is able to be drawn toward the fixed frame to clamp panels between the frames. The fixed frame is further secured to the truck by a clamp leg that may be drawn toward an interior panel of the truck so as to apply clamping action between the fixed frame against the exterior panel of the truck and the clamp leg against the interior panel. Therefore, the material carrier is easily mounted on the truck and easily removed therefrom without any modification to the truck.

7 Claims, 8 Drawing Sheets

CLAMP-ON MATERIAL CARRIER FOR A PANEL TRUCK

CROSS-REFERENCE TO RELATED APPLICATIONS

Not applicable.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTTED ON A COMPACT DISC

Not applicable.

REFERENCE TO A "MICROFICHE APPENDIX"

Not applicable.

BACKGROUND OF THE INVENTION

1. Field of the Present Disclosure

This disclosure relates generally to vehicular fixtures for carrying goods attached to the exterior of a vehicle, and more particularly to a clamp-on fixture for carrying goods secured between a fixed frame and a movable frame.

2. Description of Related Art Including Information Disclosed Under 37 CFR 1.97 and 1.98

Larsen, U.S. Pat. No. 1,991,900, discloses a plurality of spaced members, supporting members. Adjustably mounted on the spaced members and extending laterally therefrom, some of the supporting members are engagable with one side of a ladder and the supporting members are engagable with the other side of the ladder. The ladder engaging members are adjustably mounted on the supporting members and a means placed under tension is mounted on one of the spaced members that is engagable with the ladder.

Bixel, U.S. Pat. No. 2,080,527, discloses a supporting bracket having a surface upon which an object to be supported may rest. An overthrow lever having a slot and pin connection is connected to the bracket. A clamp member is pivoted to the overthrow lever intermediate of the ends of the lever and adapted to clamp the object upon the support. A tension means is so arranged as to exert tension on the pin connection in a direction as to hold the clamp member in a clamping position.

Goldfus, U.S. Pat. No. 2,980,379, discloses a rack for mounting a portable radio receiver having a mounting plate, the rack for securing the plate to a surface. A pair of arms is pivotally and slidably mounted within integral sleeve portions from opposite edges of the plate. Each of the arms includes an elbow adapted to support a projection extending from a side of the receiver. A pair of integral projections is formed from the edges of the plate and extends from the other face of the plate near the ends of the sleeves. Each of the arms bears against one of the projections when spread apart by the receiver thereby being held in a fixed angular position with respect to the plate.

Meusel, U.S. Pat. No. 3,443,730, discloses an apparatus for releasably retaining a dolly. The apparatus provides a frame having mounting plates for securement to a surface. Curved brackets on the frame receive wheels. A latch is associated with the frame for alternatively opening and closing openings adapted to receive arms of the dolly. A means for locking the arms in the openings is provided whereby the dolly may be firmly held in the apparatus, but may be quickly disengaged upon release of the latching means.

Jackson, U.S. Pat. No. 4,278,175, discloses a portable glass carrying rack which may be easily and quickly attached to a frame on a vehicle, such as a lumber truck or a pickup truck. A plurality of hooks on one end of a plurality of pipes is used to removably attach the rack to the frame. Boards interconnect the pipes and support one face of the glass to be carried. Another board attached to the end of the pipes opposite the hooks has a groove for supporting one edge of the glass. Brackets slidably attached to each of the pipes bias the lower portion of the pipes away from the truck and bias the pipes at a small angle with respect to the vertical in order to help absorb shocks caused by potholes and the like.

Weiler, U.S. Pat. No. 4,817,834, discloses a bumper mounted spare wheel carrier for a vehicle having a rear door with a latching mechanism for latching the carrier to the rear door of the vehicle so as to secure it during movement. The carrier has a first mounting bracket secured to the rear bumper and a second mounting bracket secured to the rear door of the vehicle. A carrier arm is mounted on the first mounting bracket and is adapted for pivotal movement between a first position latched to the second mounting bracket and a second position extending substantially laterally from the vehicle. A wheel bracket is attached to the carrier arm for holding the wheel. The latching mechanism, also mounted on the carrier arm, is adapted for engagement with the second mounting bracket. As a result, a low cost easy to install bumper mounted wheel carrier is provided which is firmly attached to the vehicle, yet can be easily swung away from the vehicle for removal of the spare wheel or for opening of the rear door.

Mercure, U.S. Pat. No. 4,927,032, discloses an improved clamp for use on a glass rack to hold sheets of glass. The clamp has a clamping bar pivotally mounted at one end to one side of the rack. The other end of the bar is cushioned. The bar is movable about its pivot between an upright inoperative position and a sloping operative position where its cushioned end abuts glass sheets on the rack holding them against the other side of the rack.

Hamilton, U.S. Pat. No. 4,944,434, discloses an automobile portable hauler comprising means for transporting supplies and equipment by the use of a conventional automobile on the exterior of the vehicle by the uses of brackets that are collapsible, are space savers and are easily assembled and adapted to the vehicle. There are 2 U-shaped members that are adapted to fit over the door when the window of the vehicle is open and in a down position. The U-shaped members are connected to a horizontal main member. Fastened to the main member at each end thereto is a bracket having a means for extending the main member longitudinally, a perpendicular extension in the same plane as the main member and extending forward from the door of the vehicle, and an extension member of said vertical extension to said plane of said vertical extension and parallel to the vertical section of the U-shaped member, whereby a cradle is formed at both ends of the main member to support and carry lengths of lumber, pipes, girders and other such items. The U-shaped members are longer on the outside of the door and are of such shape and configuration that they are inserted within an intermediary section whereby they may be adjusted higher or lower, and whereby they may be engaged or disengaged for easily assembly or disassembly. So also the main body extensions are of such configuration that they are easily inserted into the main body member and can be extended within limits for change of size adjustment and for easily disassembly.

McNulty, U.S. Pat. No. 4,989,768, discloses a temporarily installable, quickly and easily removable rack provides for the carriage of long and/or large sheet materials on the outside of the sidewall of a pickup truck type vehicle or the like. The rack consists of an essentially vertical beam with a shoe which rests upon the upper flange of the vehicle cargo box sidewall. The upper end of the beam is secured by a strut or cable which extends into the cargo box and is attached to the bed of the box immediately adjacent the inner sidewall. The beam has a shoe at the lower end providing for the support of any materials carried thereupon, and provision is also made for a retaining strap for the securing of materials against the beam. Attachment points for the strut or cable may be permanently installed; a temporarily installable attachment point is also disclosed which does not require modification of the vehicle structure. The rack is preferably used in pairs, installed fore and aft along the vehicle cargo box sidewall for the support of the forward and aft ends of any materials carried thereupon, thus leaving the cargo box open for the carriage of other objects. The rack is particularly suitable for use with smaller pickup type vehicles, in which a standard four foot by eight foot sheet of building material will not fit.

Moore, III, U.S. Pat. No. 5,255,951, discloses a folding side carrier rack consisting of a pair of pivotally mounted arms situated along the truck box located on the passenger side. Each rack is stored in a folding position on the inside of the front body and the inside of the tail gate. When needed for load carrying, the racks are pivoted outboard; the cargo retaining posts are raised from their stored position to the vertical; racks are stored by the reverse procedure.

Peckenpaugh, Sr. et al., U.S. Pat. No. 5,450,956, discloses a adjustable, telescopic, carrying and storage case of variable and fixed length includes a hollow adjustable, telescopic front member of variable length and a hollow adjustable, telescopic rear member of variable length that can be separated or connected tightly. The case is adjustable in length and can be used at a maximum length and at a minimum length for ease in transportation. The case is preferably used for carrying and storing different items including telescopic fishing rod assemblies. The telescopic front member comprises a first container portion and a plurality of adjustable front telescopic locking sections which are placed in an interlocking relationship through a plurality of annular tapered locking surfaces and a number of annular locking surfaces. The telescopic rear member comprises a second container portion and a plurality of adjustable rear telescopic locking sections which are placed in an interlocking relationship through a plurality of annular tapered locking surfaces and a number of annular locking surfaces.

Bianchini, U.S. Pat. No. 5,456,564, new and improved winch operated vehicle mounted carrier comprised of an upper rectangular section having a securement bar extending inwardly therefrom. The securement bar is received within a class 3 trailer hitch for securement of the upper rectangular section thereto. An electric winch is secured to the upper rectangular section. The electric winch has a drive cable there secured. The drive cable has a securement portion extending downwardly therefrom. The invention includes two pairs of arms. Each of the two pairs of arms is pivotally secured to a lower portion of the upper rectangular section. A lower support bracket is pivotally secured to an opposing end of the two pairs of arms. A latch is secured to a middle portion of the lower support bracket. The latch couples with the securement portion of the drive cable of the electric winch. A lower support tray is secured across the lower support bracket. Two spring-loaded catches are secured to an outer portion of the upper rectangular section. The catches engage the outwardly extending tabs of the arms in a locked position when the electric winch pulls the lower support bracket to a position adjacent the upper rectangular section.

Port, U.S. Pat. No. 5,713,620, discloses a carrier or rack enabling owners of passenger vans, and some delivery vans, to haul elongated objects. Such carriers or load carrying bracket attachments are provided herein for vans of the type having two sets of upper and lower external door leaf hinges. A rack element is adapted for each set of hinges, with the two cooperating or jointly forming the rack itself. Each rack element includes a support rail having upper and lower hanging brackets on its inner surface adapted to fit between the hinge leaves to hang on the upper and lower door hinges. A rigid arm attached to the front surface of the support rail extends outwardly as a boom for supporting objects such as ladders, plywood and the like which are to be carried by the van.

Brickner, U.S. Pat. No. 6,032,842, discloses a portable exterior vehicle longload carrier designed to assist in the safe and efficient transport of long loads. Two identical load carrying members are securely mounted by hanging a certain distance apart on a side of a vehicle allowing the long load to be transported along the vehicle's length. The load carrying members can be adjusted to mount securely to almost any vehicle and include padding on all surfaces coming into contact with the vehicle thereby preventing any vehicle damage. The load carrying members further include points to attach rope, wire, hook-end elastic bands or similar products to secure the load in place for safe transport.

Shaver, U.S. Pat. No. 6,126,053, discloses a vehicle equipment rack that includes first, second and third rotatably interconnected members. The second and third members rotate between a first position in which all three members are aligned and a second position in which the second and third members are angularly offset from the first member. The second and third members may also angularly offset from one another when the second and third members are in the second position. The vehicle equipment rack may also include a drive train operatively connected between the second and third members. The drive train is configured to rotate one of these moveable members upon rotation of the moveable member.

Adamczewski et al., U.S. Pat. No. 6,193,123, discloses an apparatus for carrying panel materials adjacent to a truck side panel that has a stationary work piece resting surface mounted on the truck side panel and a movable work piece clamping and supporting device positioned adjacent to the stationary work piece resting surface and mounted to the truck. A motive device such as a motor engages the truck and is connected for moving the workpiece clamping and supporting device toward and away from the work piece resting surface for sandwiching a work piece between the work piece resting surface and the work piece clamping and supporting device for enabling the truck to transport the work piece.

Cook, U.S. Pat. No. 6,450,379, discloses a load carrying vehicle accessory that includes rear, medial, and front carrier units each, having a laterally extending chassis-mounted socket member that telescopically receives a sleeve having a pair of posts thereon, the posts having adjustable spacing from a side extremity of the vehicle. The socket members can be clamped under the vehicle chassis and/or incorporated in vehicle bumpers. An optional configuration has front and/or rear mounted a base to which the socket member is pivotally mounted as an arm, the posts being foldable in-line with the arm, the arm also folding inwardly from the side of the vehicle.

Vyvoda, U.S. Pat. No. 6,845,894, discloses a side utility rack and rack kit for trucks having a pipe carrying rack or similar bed-mounted racks employs an assortment of brackets useful with conventional pipe cut in desired lengths in construction. The side utility rack is hung by means of hook brackets from a tubular member of the pipe rack and rests against the truck bed wall at a lower end inner bracket having a rubber bumper to avoid damage to the truck bed. The rack forms forward and rear cages separated by a lengthwise pipe member. The cages accept large, flat objects such as drywall panels or plywood supporting them for safe transportation. The cages may be adjusted in spacing to fit a particular truck and rack and for carrying particular lengths of flat cargo. The rack may be differently configured to fit differing racks associated with pickup or utility trucks.

Adamczewski et al, U.S. Pat. No. 7,090,105, discloses an apparatus for carrying a workpiece adjacent to an exterior surface of a vehicle, and provides a stationary resting surface mounted on an exterior surface of the vehicle and one or more movable clamping bars positioned adjacent to the resting surface. A driving screw moves the clamping bar in a scissors type motion, alternately toward the resting surface, so as to clamp the workpiece, and away from the resting surface so as to release the workpiece, whereby the workpiece may be safely transported by the vehicle. The apparatus may be mounted onto a panel truck, normally adjacent to one or both side panels, or may be mounted on the sides of a pick-up type truck.

The related art described above discloses a wide range of fixtures for providing support in transport. My two prior patents, summarized above, teach the use of the side of a vehicle for mounting panel goods and the like. U.S. Pat. No. 7,090,105 teaches the use of a rotating gate closure for clamping the goods, while my earlier patent U.S. Pat. No. 6,193,123 teaches a linear moving clamp. The present invention described and claimed herein also uses a linear clamping action, and provides a number of improvements including a mechanized clamping of the apparatus to the vehicle without modification to the vehicle, as well a separate mechanized clamping of the goods within the carrier. The present disclosure distinguishes over the prior art providing heretofore unknown advantages as described in the following summary.

BRIEF SUMMARY OF THE INVENTION

This disclosure teaches certain benefits in construction and use which give rise to the objectives described below.

A panel truck provides a material carrier made up of a fixed frame clamped to a rain gutter and a side panel of the truck and a movable frame that is able to be drawn toward the fixed frame so as to provide compression to hold a workpiece between the frames. The fixed frame is secured to the truck by a clamp leg that may be drawn toward an interior panel of the truck so as to apply clamping action between the fixed frame against the exterior panel of the truck and the clamp leg in opposition against the interior panel. Therefore, the material carrier is easily mounted on the truck and easily removed therefrom without any modification to the truck such as drilled holes or mounted brackets.

A primary objective inherent in the above described apparatus and method of use is to provide advantages not taught by the prior art.

Another objective is to provide an apparatus for carrying goods on the side of a panel truck, wherein the apparatus is easily mounted onto the truck and also easily dismounted without any modification to the truck whatsoever.

A further objective is to provide such an apparatus that accepts rigid sheet goods such as plywood panels by simple placement in a vertical orientation and then mechanically clamping such goods in place.

A further objective is to provide such an apparatus that is clamped to the truck by a simple screw drive.

A further objective is to provide such an apparatus that is able to clamp a workpiece by a further simple screw drive.

A further objective is to provide such an apparatus wherein the screw drives are operated manually.

A further objective is to provide such an apparatus that is able to be secured to the truck by clamping to a rain gutter of the truck and clamping to the side panels of the truck.

Other features and advantages of the present invention will become apparent from the following more detailed description, taken in conjunction with the accompanying drawings, which illustrate, by way of example, the principles of the presently described apparatus and method of its use.

BRIEF DESCRIPTION OF THE SEVERAL VIEWS OF THE DRAWING(S)

Illustrated in the accompanying drawing(s) is at least one of the best mode embodiments of the present invention In such drawing(s):

DETAILED DESCRIPTION OF THE INVENTION

Figure 1:
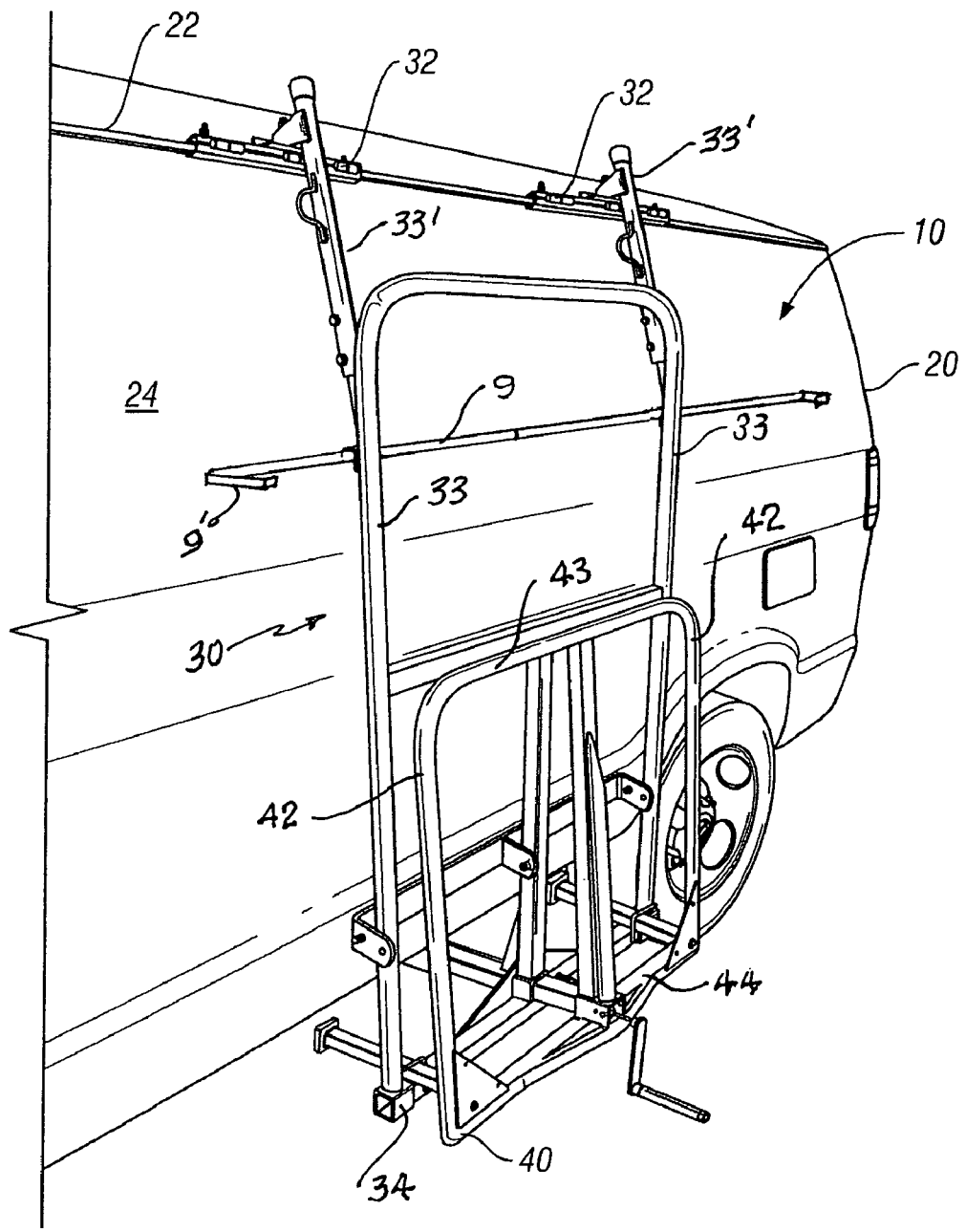
FIG. 1 is a perspective view of the presently described apparatus as mounted onto the side of a panel truck.

The above described drawing figures illustrate the described apparatus and its method of use in at least one of its preferred, best mode embodiment, which is further defined in detail in the following description. Those having ordinary skill in the art may be able to make alterations and modifications to what is described herein without departing from its spirit and scope. Therefore, it must be understood that what is illustrated is set forth only for the purposes of example and that it should not be taken as a limitation in the scope of the present apparatus and method of use.

Described now in detail is a material carrier 10 which is specifically adapted for mounting on a vehicle, particularly, but not exclusively, a panel truck 20 as shown in the drawing figures; FIGS. 1-8. Such a panel truck 20 provides an external fixture such as a rain gutter 22 that extends horizontally along the top edge of each of its exterior side panels 24 as shown in FIGS. 1-4. These rain gutters 22 are of a rigid steel stock and are securely fastened by continuous welding or other means to the side panels 24 so that they are able to withstand significant mechanical forces without delaminating, bending or otherwise failing. In the figures accompanying this description the material carrier 10 is shown mounted onto the left side panel 24 of the vehicle 20, but the right side panel, which is essentially a mirror image of the left side panel 24 may be used just as well. In some panel trucks, the right side panel may have a sliding door built into it, and if this door is of use, the left side panel 24 is a better choice for mounting the material carrier 10. The type of material preferably transported by the described carrier 10 is flat sheet goods 5 such as plywood panels, as shown in FIG. 2, but many other material types and shapes may be carried equally as well such as tubes, rods, wood or metal studs, beams, and so on. The limitation on what may be carried on the side of the vehicle is limited only by the legal vehicular width for moving over the roads chosen for transport. Clearly, the present invention is ideal for carrying long objects that may not fit inside a panel truck or in the bed of a pickup truck.

Figure 2:
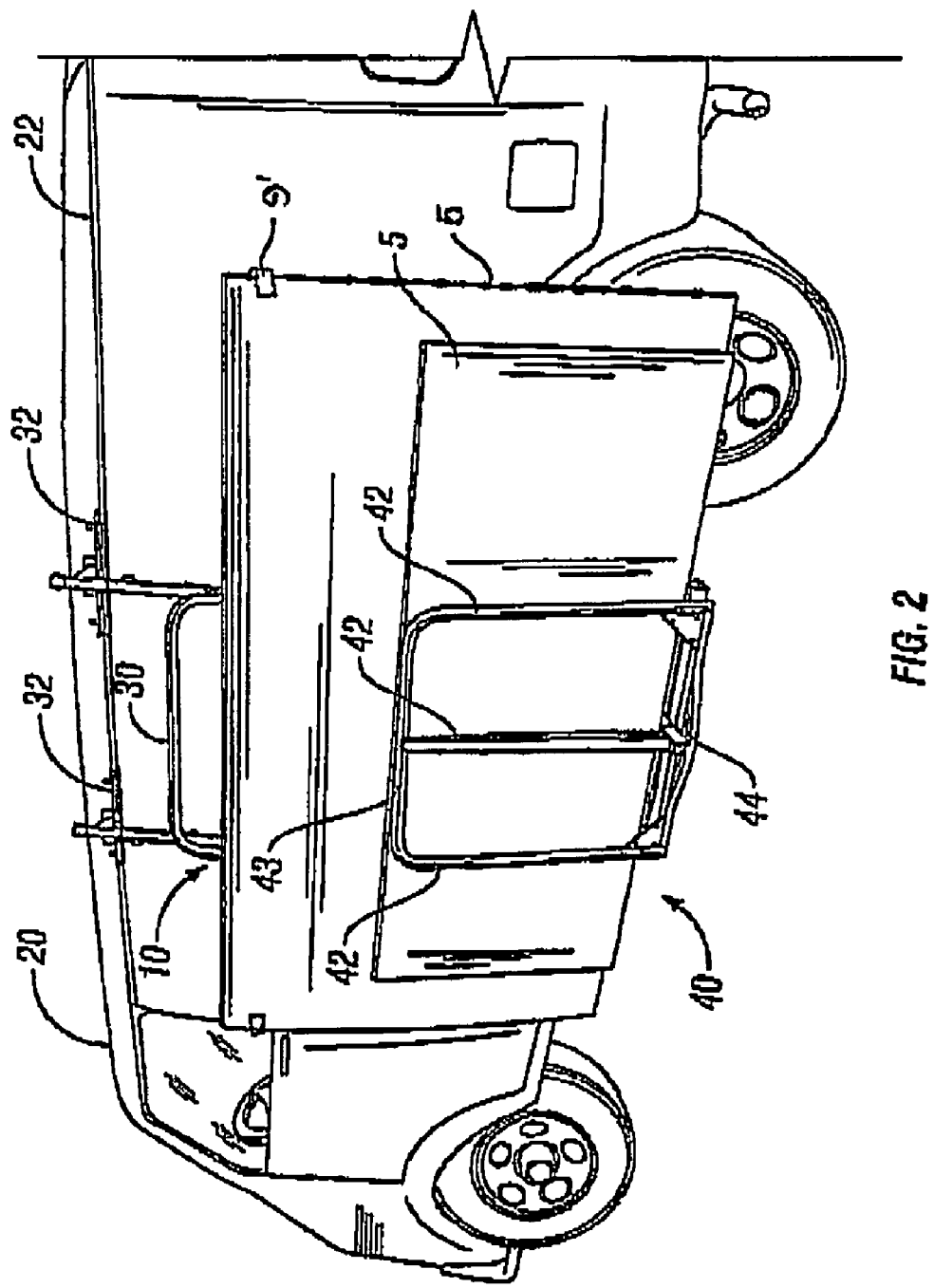
FIG. 2 is a further perspective view thereof showing the apparatus fitted with panels for transport.

The material carrier 10 provides a fixed frame 30, shown in FIG. 1, and which is preferably made up of several vertical struts 33 (FIGS. 1 and 5) which terminate at lower horizontal strut 34, and two of which terminate at an upper horizontal strut. Two outside vertical struts 33 and the upper horizontal strut 34 may be formed from a single tube which is bent to shape as shown in FIG. 1. Vertical attachment tubes 33' are used to mount the fixed frame 30 on the vehicle 20, and these tubes 33' are engaged with, and extend from the fixed frame 30 upwardly to engage gussets 15 which are engaged with hunger bars 17 (see FIG. 4A) which rest in rain gutter 22 and are secured to rain gutter 22 as shown in detail in FIGS. 3, 4 and 4A by clamps 32 each of which provide jaws mutually movable about hinges 13. Preferably, tubes 33' are telescopically extendable so that the fixed frame 30 may be selectively positioned as to its vertical location on the side of vehicle 20. When the present invention is used with a pickup truck, attachment tubes 33' are not used and instead a clamping device for gripping over the side of the pickup truck is used instead as shown in U.S. Pat. No. 7,090,105, which is hereby incorporated herein by reference.

A movable frame 40 is positioned in alignment with the fixed frame 30, as shown in FIG. 1. Frame 40 is also made up of several vertical struts 42 which terminate at lower horizontal strut 44 and upper horizontal strut 43. The construction of the frames 30, and 40, and other elements of the present invention are preferably made of tubular steel with welded construction as would be known to those of skill in the art.

Figure 5:
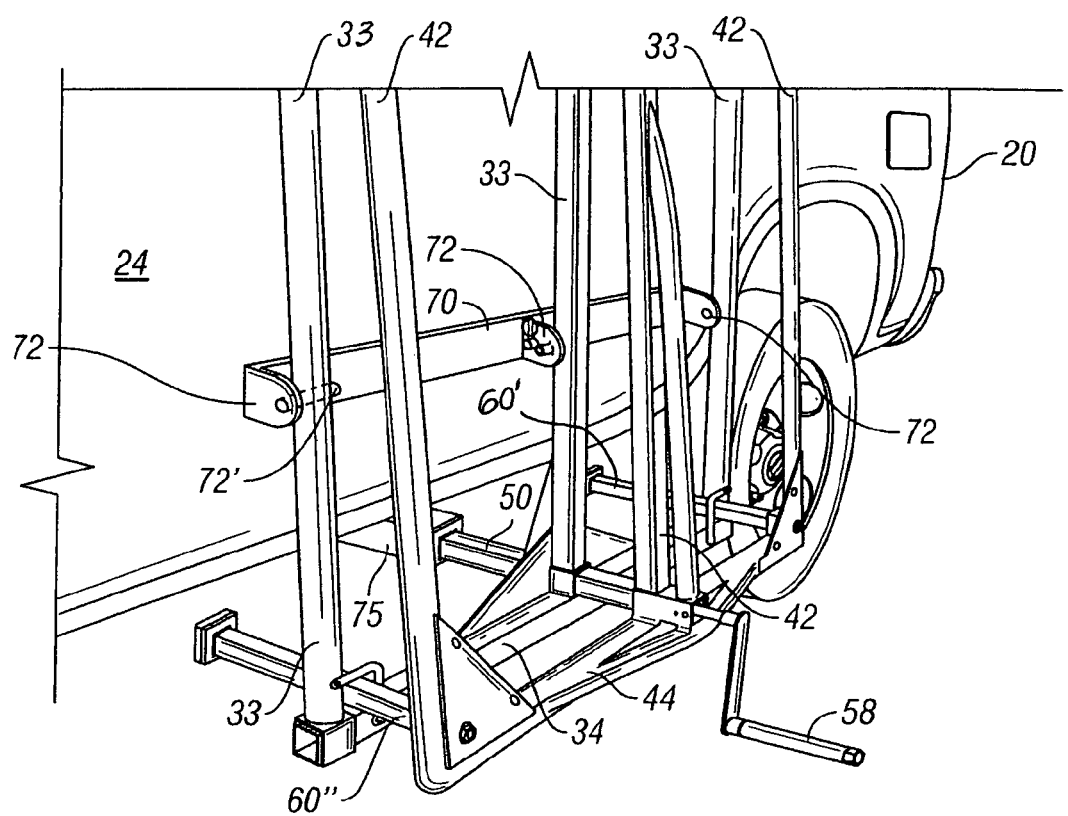
FIG. 5 is a further perspective view thereof showing a lower portion of the apparatus and its engagement against the side of the panel truck.
Figure 7:
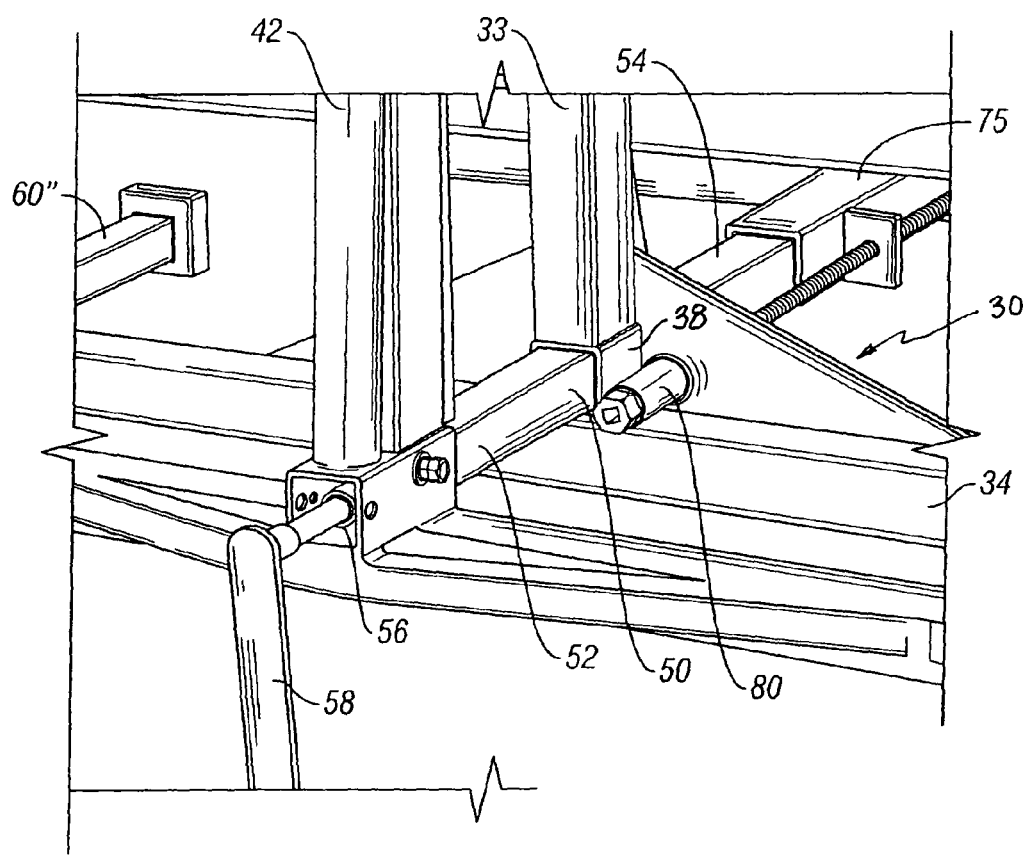
FIG. 7 is a further perspective view thereof showing details of the manner in which the apparatus is operated for clamping onto the truck and for clamping a workpiece.

As best seen in FIGS. 5 and 7, an extension drive bar 50 and lateral stability bars 60', on the right, and 60" on the left, provide for mounting the movable frame 40 onto the fixed frame 30 as well as for mutual movement. Stability bars 60' and 60" rest on horizontal strut 34, while drive bar 50 is fixed at its proximal end 52 to horizontal strut 44 and slides within a central strut mount tube 38 with its distal end 54 slidingly engaged with tube 75 which is secured to compression leg 79, as shown in FIG. 8 by arrow "A".

A compression strut 70 is mounted to fixed frame 30, as shown in FIG. 5 by ears 72 and pins 72' wherein the strut 70 is able to rotate about the pins 72' so as to enable strut 70 to abut the surface of panel 24. To prevent marring of panel 24, a material such as felt or foam rubber may be placed between strut 70 and panel 24, and such material may be advantageously permanently fixed to strut 70.

Figure 8:
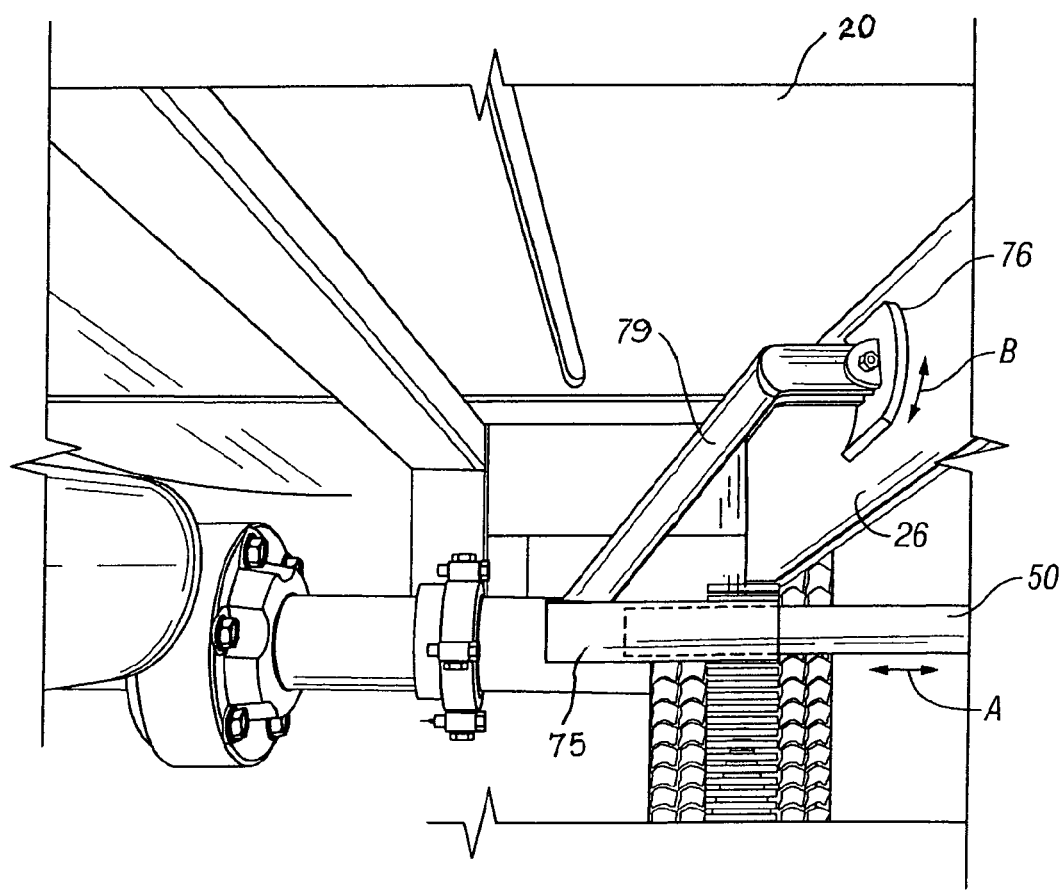
FIG. 8 is a further perspective view thereof showing the manner in which the apparatus is fitted for clamping to an interior panel of the truck.

As shown in FIG. 8, leg 79 terminates with a rotatably mounted contact piece 76. Contact piece 76 is rotational on leg 79 as shown by arrow "B", so that it is able to press against an interior panel 26 of vehicle 20 in an optimal manner, that is, without tending to slip, although interior panel 26 may not be exactly vertically oriented. It is noted that the term "interior panel" 26 docs not, here, mean a panel within the cabin or payload portions of the truck 20. Rather, "interior panel" refers to panels of the truck 20 that extend below the floor boards of the truck 20 and which are in near vertical orientation and generally spaced apart from the exterior panel 24. The meaning herein of "interior panel" 26 is illustrated in FIG. 8.

Figure 3:
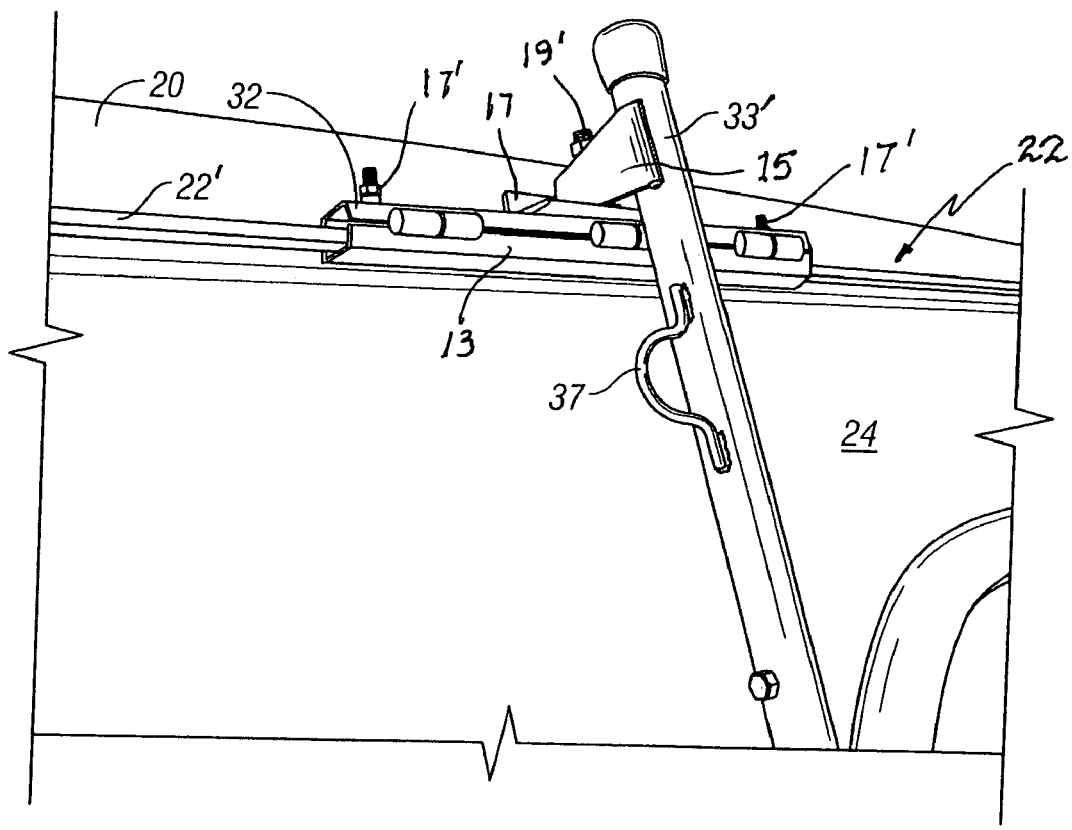
FIGS. 3 and 4 are further perspective views thereof showing the manner in which the apparatus is secured to a rain gutter of the panel truck.
Figure 4:
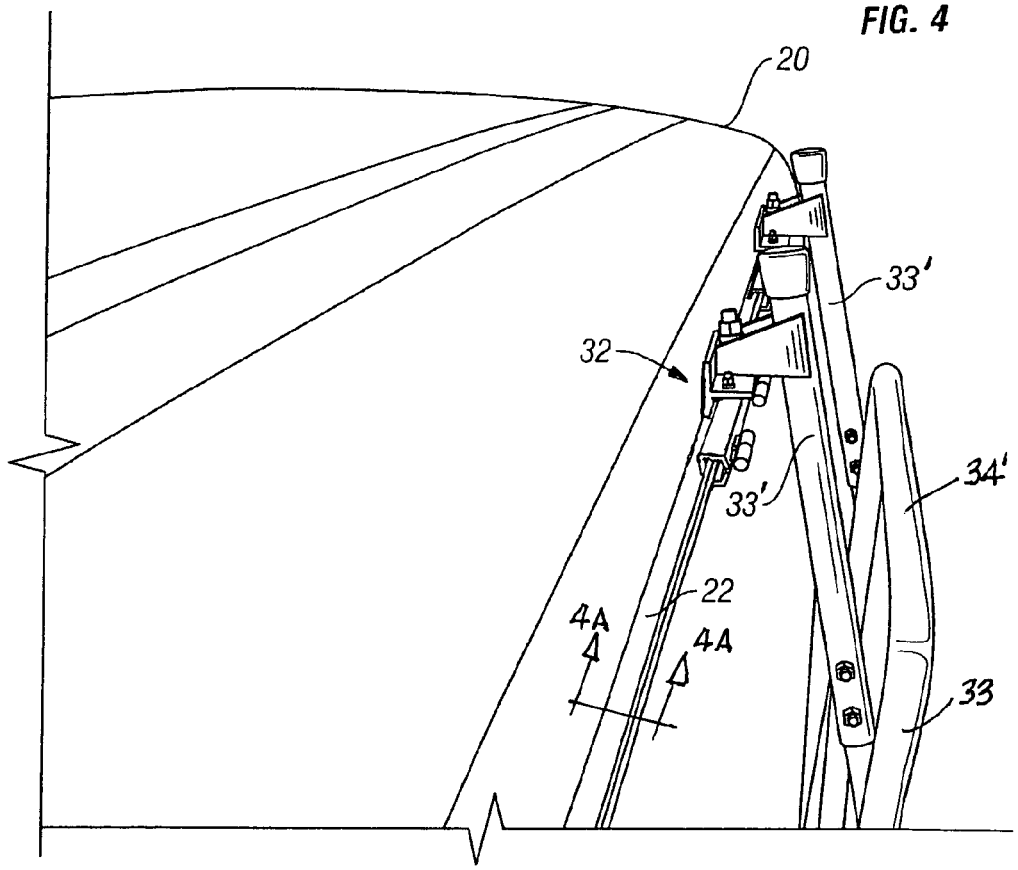
Figure 4A:
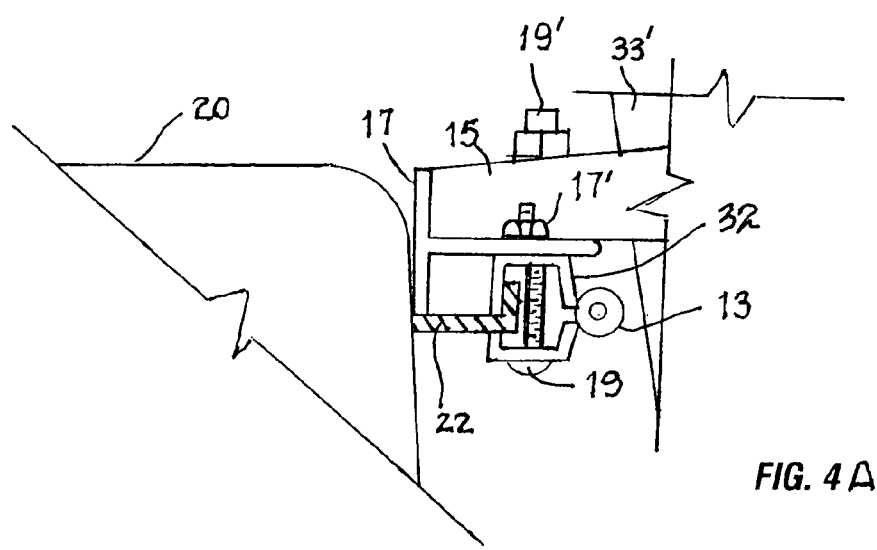
FIG. 4A is a partial sectional view taken along line 4A-4A in FIG. 4.

The clamp 32, as best seen in FIGS. 3, 4 and 4A, is adapted and positioned for compressive engagement with the rain gutter 22 thereby enabling the fixed frame 30 to be hung adjacent to the exterior panel 24 of the vehicle 20. In FIG. 4A it is shown that clamp 32 is fastened to hanger bars 17 by hardware 17' and the jaws of clamp 32 are able to be tightened onto rain gutter 22 by hardware bolt 19 and nut 19'. In the preferred embodiment, the clamp 32 is tightened down onto gutter 22 at its upwardly extending flange 22', while hanger bar 17 is moved against exterior side panel 24 and tightened in place by hardware 19, 19'. In this arrangement, hanger bar 17 receives the weight of the material carrier 10 and its payload goods 5 and transfers this load to the gutter 22 at the panel 24 so that there is no appreciable moment arm to bend gutter 22 downward. Hanger bar 17 cannot move away from panel 24 because it is fastened to clamp 32 which abuts gutter flange 22' (FIG. 3). This unique arrangement is the basic reason why the present invention is practical for carrying a significant load supported by the gutter 22.

A compression strut 70 is engaged with the fixed frame 30 in a position for resting against the exterior side panel 24 of the vehicle 20, thereby positioning the fixed frame 30 along side the exterior side panel 24.

A compression drive 80, best seen in FIG. 7, is preferably a manually operated linear screw engaged between the fixed frame 30 and tube 75, and is enabled for drawing the tube 75 toward the fixed frame 30 thereby contact piece 76 interior side panel 26 and clamping the fixed frame 30 to the exterior side panel 24.

Figure 6:
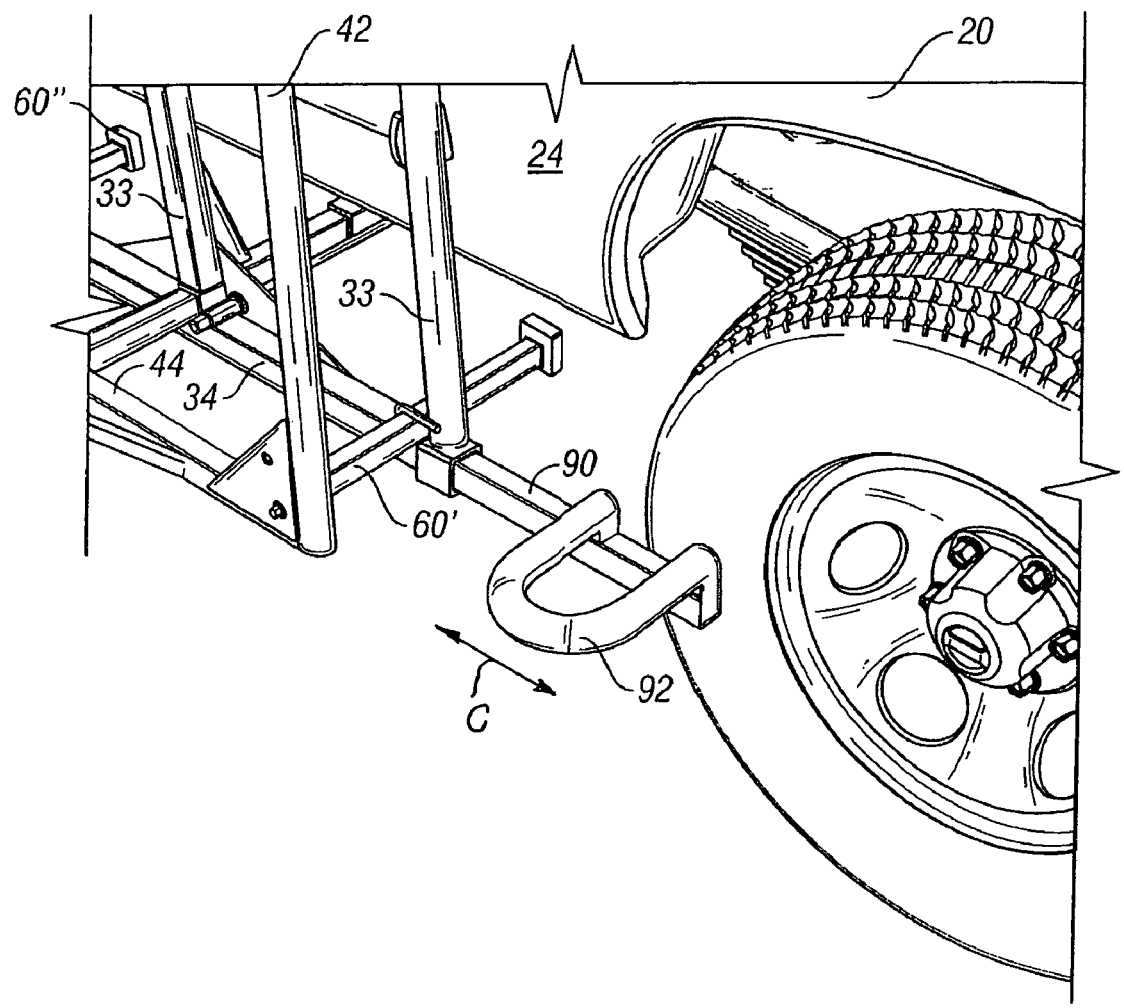
FIG. 6 is a further perspective view thereof showing an extension of the apparatus.

Within drive bar 50 is mounted a frame drive 56, preferably also a linear screw, which when rotated draws the fixed and movable frames 30, 40 together or apart depending on the direction of rotation. The compression drive 80 and the frame drive 56 are preferably adapted for being rotated by crank 58 shown in FIG. 5. When movable frame 40 is positioned apart from fixed frame 30, as shown in FIG. 6, work_piece goods 5 may be placed therebetween with the goods 5 resting on drive bar 50 and stability bars 60' and 60". After the goods 5 has been placed, the movable frame 40 may be driven toward the fixed frame 30, using frame drive 56, until sufficient clamping action has been achieved by the frames 30 and 40 against the goods 5 so as to secure the material in place on the frames. For materials, especially panels, that extend forward and aft of the stability bars 60' and 60", extension bars 90 are used to advantage. These extension bars 90 are slidingly engaged within strut 34, as shown in FIG. 6 by arrow "C", and may be secured by simple friction or by set screws so that they can be extended to provide an improved lower support for the goods 5. Extension rings 92, attached at ends of extension bars 90, and securement rings 37 (FIG. 3), (engaged with attachment tubes 33'), are used to engaged straps (not shown) which may be tightened about the goods 5 to provide further securement against dynamic forces during transport.

Preferably, a telescoping horizontal rod 9, having spaced apart terminal grippers 9', is engaged with the fixed frame 30 in a position for gripping and thereby holding the goods 5 when the goods 5 is clamped between the fixed 30 and movable 40 frames as shown in FIG. 2. The rod 9 prevents the goods 5, when it is of fragile or flimsy panel construction, from bending or arching away from the external side panel 24 during transport.

The enablements described in detail above are considered novel over the prior art of record and are considered critical to the operation of at least one aspect of the apparatus and its method of use and to the achievement of the above described objectives. The words used in this specification to describe the instant embodiments are to be understood not only in the sense of their commonly defined meanings, but to include by special definition in this specification: structure, material or acts beyond the scope of the commonly defined meanings. Thus if an element can be understood in the context of this specification as including more than one meaning, then its use must be understood as being generic to all possible meanings supported by the specification and by the word or words describing the element.

The definitions of the words or drawing elements described herein are meant to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements described and its various embodiments or that a single element may be substituted for two or more elements in a claim.

Changes from the claimed subject matter as viewed by a person with ordinary skill in the art, now known or later devised, are expressly contemplated as being equivalents within the scope intended and its various embodiments. Therefore, obvious substitutions now or later known to one with ordinary skill in the art are defined to be within the scope of the defined elements. This disclosure is thus meant to be understood to include what is specifically illustrated and described above, what is conceptually equivalent, what can be obviously substituted, and also what incorporates the essential ideas.

The scope of this description is to be interpreted only in conjunction with the appended claims and it is made clear, here, that each named inventor believes that the claimed subject matter is what is intended to be patented.

What is claimed is:

1. A material carrier for mounting on a vehicle having an exterior and an interior approximately vertical side panels, the material carrier capable of supporting goods during transport, the material carrier comprising:
   a fixed frame and a movable frame oriented in near vertical and mutually approximately parallel adjacent alignment;
   a drive bar fixed to the movable frame, and slidingly extensive through a strut mount tube of the fixed frame, and terminating within a compression tube positioned below the vehicle;
   a rigid compression leg fixed to the compression tube and positioned at an angle relative to the drive bar and the compression tube for contacting the internal side panel of the vehicle;
   a compression drive engaged between the fixed frame and the compression tube, the compression drive enabling the compression tube to move toward the fixed frame for pressing the compression leg against the interior side panel of the vehicle thereby enabling the fixed frame for moving toward the exterior side panel; and
   a frame drive positioned within the drive bar and enabled for moving the drive bar to change spacing between the fixed and movable frames while maintaining parallel positions therebetween.

2. The material carrier of claim 1, further comprising an attachment tube secured to the fixed frame and extending upwardly therefrom, the attachment tube enabled for clamping onto a fixture of the vehicle, thereby enabling the fixed frame to hang at a selective vertical position adjacent the exterior panel of the vehicle.

3. The material carrier of claim 1, further comprising resting means for supporting goods for being transported by the vehicle, the resting means including two spaced apart stability bars positioned for resting on a horizontal strut of the fixed frame.

4. The material carrier of claim 3, further comprising extension bars are slidingly engaged within the horizontal strut.

5. The material carrier of claim 4, further comprising securement rings engaged at ends of the extension bars.

6. The material carrier of claim 1, further comprising a compression strut engaged with the fixed frame in a position for being rested against the exterior side panel of the vehicle.

7. The material carrier of claim 1, further comprising a telescoping horizontal rod mounted on the fixed frame and having spaced apart terminal grippers positioned for gripping and holding opposing vertical edges the transported goods.

\* \* \* \* \*